Patented Sept. 24, 1946

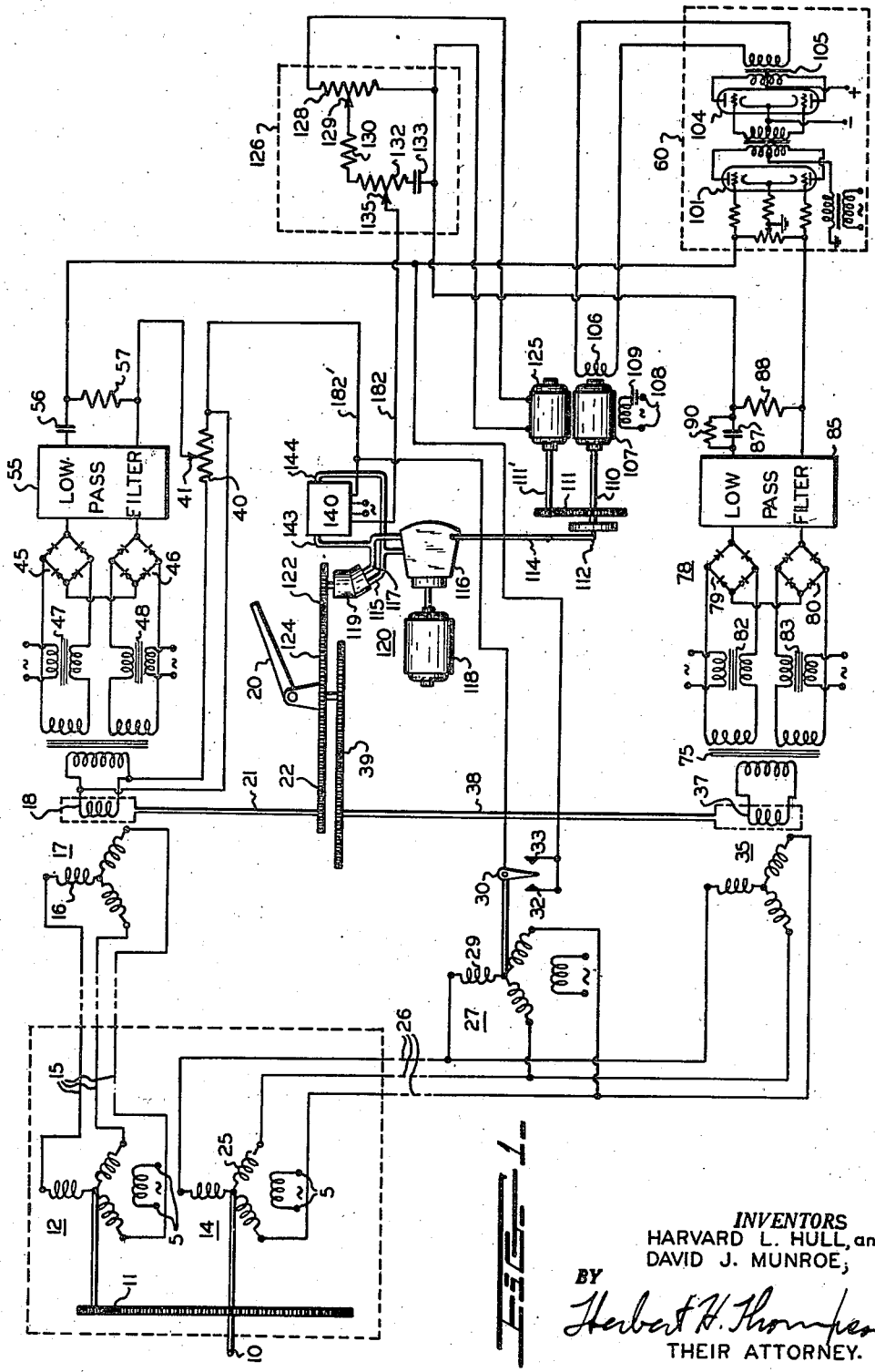

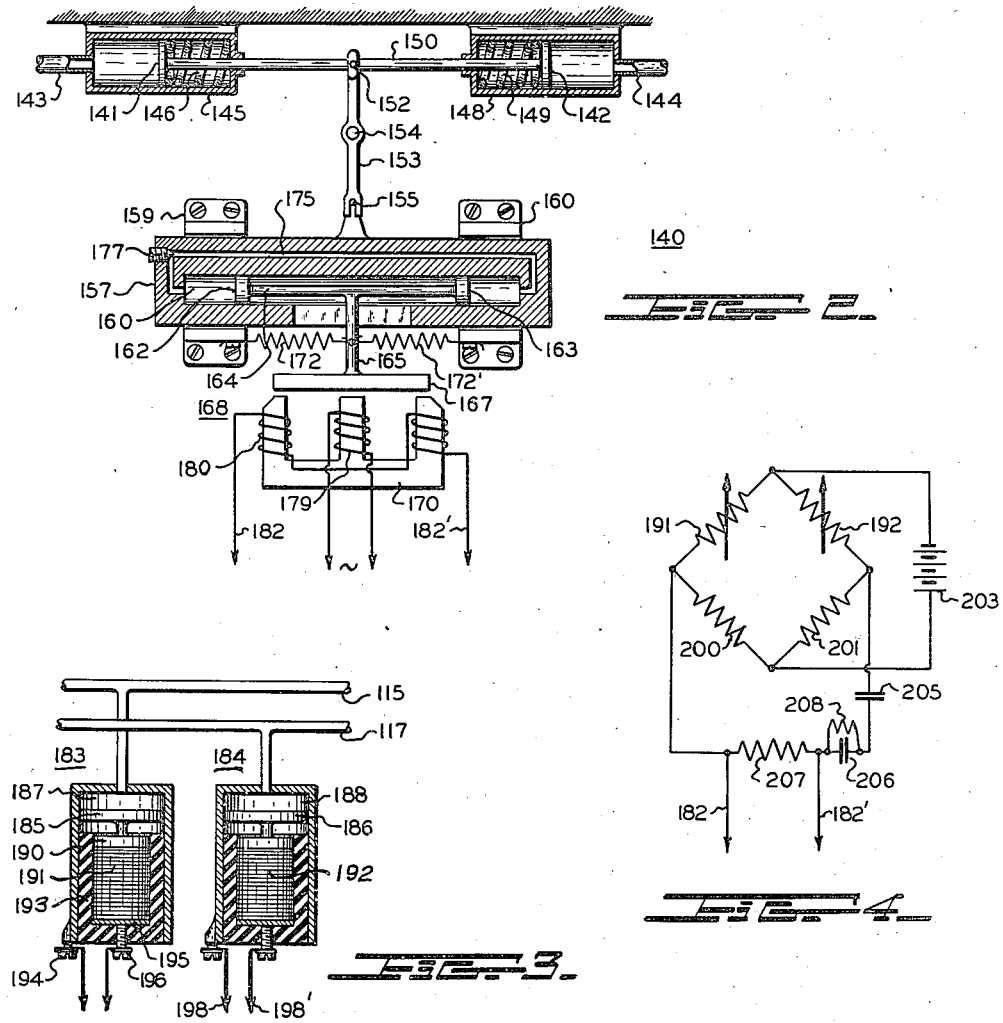

2,408,070

UNITED STATES PATENT OFFICE 2,408,070

SYSTEM FOR POSITIONING HEAVY OBJECTS

Harvard L. Hull, East Williston, and David J. Munroe, Brooklyn, N. Y., assignors to Sperry Gyroscope Company, Inc., Brooklyn, N. Y., a corporation of New York Application June 20, 1942, Serial No. 447,828

19 Claims. (Cl. 60—53)

The invention relates to systems for automatically positioning guns or other objects possessing substantial inertia in accordance with positional data supplied from a remote source and has to do with systems of the above type in which control of the positioning means is exercised by varying the setting of a speed controller.

Systems of the general type above referred to include the arrangements disclosed in the copending applications of one of the present inventors, H. L. Hull, joint with W. S. Gorrill and W. F. Frost, Serial Nos. 425,146 and 441,400 filed December 31, 1941 and May 1, 1942, respectively. Such systems employ both fine and coarse data channels to supply control signals proportional in different ratio to the error in following, these signals being selectively utilized to control the positioning means dependent upon the magnitude of the error.

Thus, during normal operation, the fine channel signal exercises control but if the error exceeds a predetermined amount control is shifted to the coarse signal by some form of synchronizing means. Conversely if the initial error is beyond the range of control of the fine signal the coarse signal acts to reduce the error to a value within such range, after which the fine signal should promptly assume control. However, certain difficulties are encountered in synchronizing from a position greatly different from the datum position among which is the tendency of the controlled object to overshoot not only the synchronous position but to pass through and beyond the entire range of fine control so that an oscillation or oscillators of considerable magnitude may occur before the system settles down to normal operation.

To overcome this undesirable tendency, and also to prevent undue strain of the positioning means resulting from sudden starts and stops, the system disclosed herein makes use of a coarse error rate term which effects retardation of the controlled object as it approaches the fine control range and thereby enables the fine signal to take control promptly when the error falls within this range. During normal operation, a fine error rate or damping term is used to prevent hunting about the synchronous position.

The effectiveness of rate terms in damping oscillations of the controlled object, and also other operational characteristics of a positional control system, is a function of the time lag or phase shift of the response of the positioning means relative to the causitive signal. Appreciable lag occurs in many type of drives due to inertia effects, elastic deformation, and other similar factors.

Considering more particularly the driving means illustrated in the present and the above referred to applications, which has important advantages in the positioning of heavy objects, such means comprises a variable speed hydraulic gear of the type known to the trade as the Vickers gear wherein a variable displacement pump drives a hydraulic motor at a speed corresponding to the pump displacement. The operating fluid used in such a drive is usually an oil of relatively low viscosity (particularly at working temperatures) which is subjected, in operation, to pressures ranging up to several hundred pounds per square inch. Leakage in the pump and motor of such a drive increases with increasing operating pressure and may be considered to be proportional to pressure, at least to a first approximation. Likewise compression of the oil increases substantially in proportion to increasing pressure. Because of these two factors the full effect of a change of displacement setting of the pump is not at once translated into a change of operating speed of the hydraulic motor and this lag is substantially proportional to the operating pressure.

To overcome the harmful effects of lag in the hydraulic gear on the response of the controlled object to controlling signals, including the reduced effectiveness of the damping signals due to improper phase relationships, the present invention includes means for obtaining and utilizing a corrective term which is proportional to the oil pressure of the hydraulic drive.

One object of the invention, therefore, is to provide in a positional control system employing fine and coarse control channels, means in addition to normal synchronizing means, aiding the shifting of control from the coarse to the fine channel.

Another object is to provide, in a system wherein a controlled object is driven in correspondence with received positional data, means governing the operation of the controlled object driving means in accordance with fine and coarse measures of the error in following and the rate of change of each.

Another object is to provide in a positional control system employing both fine and coarse control channels, means for obtaining the rates of change of the error signals in each of said channels and utilizing said rates independently to damp the motion of the controlled object over different ranges of error.

Another object is to provide in a positional control system employing both fine and coarse control channels means within the coarse channel operative to retard motion of the controlled object as the fine control range is approached, thereby to prevent overshooting said range.

Another object is to provide, in a control system employing hydraulic driving means, compensation for factors delaying or modifying the output response of such means to an input impulse or signal.

Another object is to provide compensation for the compressibility of the operating fluid in hydraulic driving means for a controlled object in a positional control system.

Another object is to provide compensation for phase displacement in such hydraulic means between an applied controlling impulse and the response of the driven object thereto.

A further object is to compensate for variable leakage in such hydraulic means.

Other objects and advantages of this invention will become apparent as the description proceeds.

It is to be understood that the term "factor" as employed herein and in the claims is to be construed as including not only those factors hereinabove stated for exemplary purposes as inertia, elasticity, leakage and compression, such examples being applicable to the hydraulic system herein illustrated, but also as including other factors which are detectable or measurable and which cause lag in the system. Additionally, elastic deformation of an element, as recited in the claims, may occur in a hydraulic sense in the fluid, as an element, as well as in a mechanical sense in various parts or elements of the drive.

In the drawings,

Fig. 1 is a schematic representation of a system, according to the invention, for positioning a gun or other heavy controlled object in accordance with received positional data.

Fig. 2 is a detail, partly in section, of a pressure sensitive device suitable for obtaining an electrical signal.

Fig. 3 is a sectional view of a different type of pressure sensitive device.

Fig. 4 is a diagram of an electrical circuit suitable for use with the device of Fig. 3.

Referring now to Fig. 1, the apparatus units shown within the dashed lines in the upper left-hand corner are normal elements of a gunfire director, for example, of the type described in U. S. Patent No. 2,065,303, to E. W. Chafee et al., dated December 22, 1936. These units together with the other apparatus of Fig. 1 constitute control means for aiming the gun in one dimension only, e. g., in azimuth. It is to be understood that, in addition, a similar grouping of apparatus, omitted here to simplify the illustration of the invention, will, in practice, be used to govern the aiming of the gun in elevation. Also, certain auxiliary apparatus such as power limiting means, manual operating means and hydraulic limit stops, disclosed in the aforementioned applications 425,146 and 441,400, may advantageously be employed in connection with the arrangements of the present invention, reference being had to the prior applications for details of such devices.

The value of gun azimuth angle as computed by the director is represented by the angular position of shaft 10. Since the shaft 10 corresponds to the computed gun position data it represents corresponding positional data. It will be appreciated, however, that instead of being an element of a fire control director, shaft 10 may itself be considered either a controlling object or a source of positional data. On the other hand it may be connected to and angularly positioned by any other controlling object, for example, a telescope or other sighting device. Shaft 10 drives the rotors of fine and coarse Selsyn transmitters 12 and 14 at different rates determined by the ratio of gears 11. Both transmitters have stator windings excited from a single source of alternating current 5 which is preferably a common supply for the entire system in order to secure a uniform phase. Fine transmitter 12, which is driven at the faster rate and therefore generates the larger of the two signals for a given displacement of shaft 10, has its rotor winding connected by three-conductor transmission line 15 to the winding of stator 16 of Selsyn receiver 17 which is operated as a synchro transformer or signal generator by having its rotor 18 driven from gun 20 by way of shaft 21 and intermediate gearing 22.

Rotor winding 25 of coarse transmitter 14 is connected by three conductor transmission line 26 to a pair of Selsyn receivers, one of said receivers 27, being operated as a free rotor device. Receiver 27 has a rotor 29 carrying on its shaft a contact 30 which may be closed, upon suitable displacement of rotor 29 in one direction or the other, to either of contacts 32 or 33, these two contacts being connected in parallel. Receiver 27 has a casing, not shown, of a known type mounted for rotation and geared to the gun so that the entire receiver turns with the gun while the rotor 29 thereof is free to turn with respect to the casing. This arrangement is shown in the patent to Mittag et al., No. 1,958,245, issued May 8, 1934. The second receiver 35 is likewise connected to transmission line 26 and is operated as a synchro transformer by having its rotor 37 driven from gun 20 by way of shaft 38 and intermediate gearing 39 to furnish a coarse positional control signal.

The utilized fine error signal is derived from the alternating potential induced in winding 18 by applying this potential to potential divider resistance 40 having an adjustable contact 41. The rate of change of the fine error is obtained by applying the voltage of winding 18 to a balanced modulator or full-wave rectifier comprising a pair of bridge type rectifiers 45 and 46 which may each comprise elements of the dry disc type. In order to obtain a phase sensitive device, each half wave rectifier is supplied with an A. C. bias from the common supply, rectifier 45 being biased by a voltage supplied by way of transformer 47 and rectifier 46 by a voltage from transformer 48. The joint output of rectifiers 45 and 46, which is a reversible polarity continuous voltage, is filtered by means such as low pass filter 55 to remove ripple and applied to an electrical differentiating circuit comprising condenser 56 and resistance 57 connected in series.

It is known that in order to effect differentiation, the time constant of such a resistance-capacity network should be low or, if alternating quantities are considered, the reactance of condenser 56 should be large in comparison with the value of resistance 57 and under such conditions the voltage across resistance 57 may be considered to be substantially proportional to the time rate of change of the output of filter 55, i. e., proportional to the rate of change of the fine error signal. The voltage across resistance 57 is applied, together with the fine error voltage taken from resistance 40, as an input to amplifier 60 in combination with certain other signal voltages to be described hereinafter.

The coarse error signal is derived from the alternating potential in winding 37 by way of input transformer 75 and is rectified in a balanced phase-sensitive modulator or rectifier 78 comprising bridge-type rectifiers 79 and 80, respectively biased from the common A. C. supply by voltages introduced through transformers 82 and 83 respectively. The output of rectifier 78 is filtered in low pass filter 85 to remove ripple and the D. C. component is applied to a differentiating circuit comprising condenser 87 and resistance 88 in series. Condenser 87 is shunted or by-passed by a resistance 90. The utilized signal is the voltage across resistance 88 which is applied in series with the previously described signals and other signals to be described hereinafter as an input to amplifier 60.

Amplifier 60 may be of the type described in applications 425,146 and 441,400 previously referred to, comprising a modulator stage including tube 101 which receives an alternating voltage both as a plate supply and as a grid bias. Tube 101 is coupled to a second amplifying stage including tube 104, the output of which, through transformer 105, is applied to one of the stator phases 106 of two-phase induction motor 107 having a second phase 108 supplied from the common A. C. source through a phase-adjusting condenser 109. A distinctive feature of amplifier 60 is that it supplies a reversible phase A. C. output responsive to either a reversible phase A. C. input or a reversible polarity D. C. input or the two in combination. This makes it unnecessary to convert all of the control signals to one type of electrical quantity, alternating or continuous potentials being equally effective in controlling the amplifier output.

Motor 107 drives shaft 110 on which is mounted crank 112 operatively connected to reciprocate stroke rod 114 of the variable displacement pump or "A" end 116 of a Vickers variable speed hydraulic drive, generally designated by reference numeral 120. Pump 116 is continuously driven by motor 118 and its displacement may be varied by changing the angle between the drive shaft of the pump and the drive shaft of motor 118, which angle is, in turn, determined by the longitudinal position of stroke rod 115. A universal driving connection (not shown) permits tilting of the entire pump relative to the motor shaft under the control of the stroke rod. Pump 116 supplies operating fluid at a rate dependent upon its effective displacement to the hydraulic motor or "B" end of the Vickers drive 119, by way of connecting pipes 115 and 117, to operate this motor at a speed substantially proportional to the displacement of the pump and therefore proportional to the position of stroke rod 114. Motor 119, through gearing 122, drives platform 124 on which gun 20 is mounted.

A direct current generator 125 of either the permanent magnet type or having a suitably excited field is driven by stroke motor 107 at a speed proportional to the rate of change of position of stroke rod 114. The actual operating speed of generator 125 may be determined by gearing or other connecting means, as 111, between shaft 110 and the generator armature shaft. The continuous potential output of generator 125 is applied to an integrating and combining circuit 126 comprising an input potential dividing resistance 128 having an adjustable contact 129 slidable thereupon and resistances 130 and 132 and condenser 133 connected in series. Resistance 130 is preferably adjustable. The output of integrating circuit 126 is the voltage drop across condenser 133 and across a portion of resistance 132 determined by the setting of adjustable contact 135 thereupon. This output voltage is applied as an input to amplifier 60 by way of the series circuit combining the several control signals.

As previously stated, the effect of damping signals is reduced by the lag or phase displacement in the response of the hydraulic motor to adjustment of stroke rod 114, due to leakage and compression of the hydraulic pressure fluid. In order to compensate for this lag or phase displacement, a signal corresponding to changes in the pressure of fluid, i. e., changes in the torque of the motor, is developed and used to modify the control signals in the following manner.

The pressure at which operating fluid is supplied by pump 116 to motor 119 governs the actuation of a further signal generating device 140 shown more in detail in Fig. 2. In this figure it will be seen that the pressures existing in pipes 117 and 115 are communicated to a pair of opposed pistons 141 and 142, respectively, by way of connecting pipes 143 and 144, respectively. Piston 141 is displaceable in cylinder 145 by oil pressure in pipe 143 against the opposition of spring 146 while piston 142 is displaceable in cylinder 148 by pressure in pipe 144 against the opposition of spring 149. Pistons 141 and 142 are mounted on opposite ends of a common piston rod 150, which, through a pin and slot connection 152 rotates rocker arm 153 about pivot point 154. Through another pin and slot connection 155 at its lower end rotation of rocker arm 153 is caused to translate cylinder block 157, slidable in guides 159 and 160.

Cylinder block 157 has a cylindrical bore 160 in which pistons 162 and 163 slide. These pistons are mounted on opposite ends of piston rod 164 which has a central lateral extension or arm 165 carrying at its extremity the magnetically permeable armature 167 of a pick-off device 168 which includes a magnetizable core 170 cooperating with armature 167. Resistance to displacement of the assembly of piston rod 164 and armature 165 is provided by oppositely acting springs 172 and 172' which centralize armature 167 relative to core 170. The opposite ends of bore 160 in cylinder block 157 are connected by a restricted conduit 175 and this conduit and the end portions of the bore are preferably filled with a viscous fluid which is pumped through the conduit upon displacement of the pistons. Suitable means for replenishing fluid lost by leakage past the pistons may be provided. Conduit 175 is adjustably restricted by means of screw operated needle valve 177 to provide variable opposition to the transfer of fluid between opposite ends of cylinder 160 and thereby a variable time delay in the centralizing of armature 167.

Core 170 of pick-off 168 is formed with three parallel legs, the central leg being provided with an exciting winding 179 connected to a suitable A. C. source, while the outer legs mount, respectively, the coils of output winding 180, connected by leads 182, 182' to the input circuit of amplifier 60. Pick-off 168 is of a well known type which is widely used as a signal pick-off from sensitive instruments for translating displacement of a member into an alternating electrical potential. Thus, when armature 167 is centralized with respect to core 170, the two parts of winding 180 receive equal alternating potentials by induction which may be caused to annul one another. When armature 167 is displaced, however, this balance is upset and a net alternating voltage proportional to the displacement exists in winding 180.

As alternative means for obtaining an electrical output responsive to the operating pressure of the variable speed hydraulic drive, there is shown in Fig. 3 a pair of carbon pile devices 183, 184 which are adapted to be actuated in accordance with the pressures in pipes 115 and 117. Pistons 185 and 186 of these devices are slidable in cylinders 187 and 188 respectively. Piston 185 is integral with a pressure plate 190 which bears on a stack of carbon discs 191 in an insulating housing 193. Electrical contact to one end of the stack is made by way of plate 190, piston 185, cylinder 187 and output connector 194 while connection to the other end of the stack is made by way of conducting plate 195 and output connector 196. Similar arrangements in device 184 permit change of pressure exerted on piston 186 to cause variations of the resistance of carbon pile 192 which may be connected in circuit by leads 193 and 198'.

The carbon piles 191 and 192 of devices 183 and 184 respectively form variable resistances which may be utilized as elements in a variety of circuits, one of which is shown in Fig. 4. In this circuit, fixed resistances 200 and 201 form with variable resistances 191 and 192 a Wheatstone bridge circuit excited by battery 203 and supplying an output potential to a circuit comprising condensers 205 and 206 and resistance 207 in series. Condenser 206 may be shunted by a resistance 208 to obtain an output. The potential drop across resistance 207 may be applied by way of leads 182 and 182' to the input to amplifier 60 as a substitute for the potential applied by this lead in Fig. 2.

In order to trace the operation of the described system, assume that shaft 10 experiences a more or less sudden angular displacement proportional to a change of computed gun azimuth angle. An alternating potential proportional to this displacement is induced in winding 18 and a fraction thereof, determined by the setting of contact 41, is taken from potential dividing resistance as the utilized fine error signal. At the same time, there is obtained at the output of filter 55 a continuous voltage likewise proportional to the voltage in winding 18 and, through the operation of the differentiating circuit comprising condenser 56 and resistance 57, there is obtained across resistance 57 a continuous potential proportional to the rate of change of the fine error signal.

Under the influence of the fine signal and the rate of change thereof, motor 107 is caused to position pump stroke rod 114 of the Vickers drive to change the operating speed of hydraulic motor 119 of said drive. Owing to the resulting change of displacement of pump 116 while this pump is being operated at a constant speed by motor 112, a change of operating pressure occurs in connecting pipes 115 and 117 which is transmitted to pistons 141 and 142 (Fig. 2) and causes a displacement of piston rod 150 from its central position which, through connecting linkage, causes a translational displacement of cylinder block 157.

Pistons 162 and 163 in cylinder 160 will initially follow the motion of cylinder block 157 against the differential opposition of springs 172 and 172' thereby displacing armature 167 and inducing an unbalanced alternating potential in two-part output winding 180 on core 170. This potential is applied by leads 182 and 182' to the control circuit which combines the various input signals applied to amplifier 60. After the initial displacement of armature 167, a gradual centralization occurs under the influence of springs 172, 172' which is permitted by pumping of fluid through conduit 175 from one end of cylinder 160 to the other at a rate determined by the adjustment of needle valve 177. Thus, during extended periods when a constant pressure difference exists between pipes 115 and 117, no net signal is supplied by device 168.

The damping of the system, as in the arrangement of the above-mentioned application Serial No. 441,400, is obtained by causing the output of direct current generator 125 (operated in correspondence with change of position of stroke rod 114) to be applied to integrating and combining circuit 126 which supplies as an output a continuous potential having components proportional to the input voltage to circuit 126 and to the time integral of said voltage, that is, respectively proportional to the rate of change of position of stroke rod 114 and to the position of said rod, the latter component therefore being substantially proportional to the rate of change of displacement of gun 20.

The first named component, which is the drop across a portion of resistance 132 determined by the position of adjustable contact 135, is by its nature effective in damping oscillations of stroke rod 114 and associated members, while the second component is effective in damping oscillations of the gun. The time constant of the integrating circuit comprising resistances 130 and 132 and condenser 133 is adjustable by varying the value of resistance 130.

The coarse error signal is obtained in a manner similar to that described in connection with the fine error signal. Displacement of shaft 10 causes a voltage proportional thereto to be induced in winding 37 of the coarse synchro transformer or signal generator of a phase corresponding to the sense or direction of the displacement. The output of filter 85 supplies a continuous potential proportional to the alternating voltage of winding 37 and the potential drop across resistance 88 has components respectively proportional to the applied voltage and the rate of change thereof, the first component being derived by way of the path which includes resistance 90 and the second of the components being derived by way of the path which includes condenser 87. These two components are, respectively, the coarse error signal and the rate of change of signal which are applied to amplifier 60.

During normal operation, the coarse error signal is of negligible importance in comparison with the fine error signal but when a predetermined magnitude of error is exceeded, contact 30 operated by coarse Selsyn receiver 27 is closed to either of contacts 32 or 33, depending upon the sense of the error, thus short-circuiting the outputs of the fine error and fine error rate circuits, control then being exercised by a combination of the coarse error, coarse error rate, the damping signals and the hydraulic pressure signals. In synchronizing the sending and receiving elements of the system, when the value of the error causes the coarse channel to be in control, the control term proportional to the rate of change of the coarse error opposes the effect of the error signal in proportion to the rate of change thereof and thereby slows the speed of operation of motor 107 and may reverse the direction of operation thereof before the synchronizing point is reached, thereby slowing hydraulic motor 116 to prevent passing through and over-shooting the fine range of control.

As soon as the error is within the fine control range, contact 30 is disengaged from contact 32 or 33, as the case may be, and the fine error signal and its rate immediately become effective in bringing the gun to the exact synchronizing point. To summarize the effects of the various control signals which are utilized, normal control is exercised by the fine error signal and fine error rate, the latter term tending to prevent hunting within the fine range of control. The damping signals obtained from circuit 126 are effective in stabilizing the system and preventing hunting of the members thereof and the occurrence of a constant speed lag is prevented since the charge on condenser 133 leaks off during extended intervals of constant speed operation and no output is then obtained from circuit 126. The occurrence of speed lag in a system in which the driving means is velocity controlled, such as is described herein, is further discussed in application Serial No. 441,400.

The signal obtained in response to change of oil pressure of the variable speed hydraulic drive, by increasing the output of amplifier 60 when there is a sudden increase in oil pressure in correspondence with a demand for a sudden change of operating speed of motor 119, dies away when this pressure remains constant and therefore is inoperative to change the positional phase at which gun 20 follows a constant rate of change of data.

Since amplifier 60 is responsive to both alternating and continuous potentials, the modification of the oil pressure signal generator shown in Fig. 3, which as used in the circuit of Fig. 4 furnishes a continuous potential output across resistance 207, is adapted to provide a signal compensating for lag in the hydraulic transmission arising from oil compression and oil leakage, particularly during periods of suddenly increased pressure, in a manner generally similar to the use of the alternating output of device 168. It will be apparent that differential compression of carbon piles 191 and 192, by bringing about a change of the balance of the bridge circuit, causes a continuous potential to be applied across condensers 205 and 206 and resistance 207. By shunting condenser 206 with resistance 208 the voltage across resistance 207 may be caused to have a component proportional to the supply voltage while the effect of condenser 206 is to produce a component substantially proportional to the rate of change of the applied voltage. Condenser 205 acts mainly as a blocking condenser so that when the charge on condenser 206 leaks off during periods of constant differential oil pressure no voltage appears across resistance 207 and the oil pressure term disappears.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described our invention, what we claim and desire to secure by Letters Patent is:

1. In a positional control system, a controlled object, driving means therefor, a source of positional data, means for obtaining fine and coarse measures of the disagreement between the position of said object and data of said source and a measure of the rate of change of said disagreement, coarse synchronizing means operative to control said driving means in accordance with a combination of said coarse measure and said rate of change of disagreement during the occurrence of disagreement of large magnitude, means operative to control said driving means in accordance with said fine measure during the occurrence of disagreement of lesser magnitude, and means shifting control between said last two means at a predetermined value of disagreement.

2. In a positional control system, a controlled object, driving means therefor, a source of variable positional data, means exercising normal control of said driving means responsive to disagreement between the position of said object and data of said source within a portion of the range of said data, including means for suppressing hunting during normal control, and means operative during the occurrence of disagreement greater than said portion of the range of said data to control said driving means in accordance with a combination of quantities including the rate of change of disagreement, to return said object to the range of normal control without oscillation.

3. In a positional control system, a controlled object, driving means therefor, a source of positional data, coarse and fine control channels for said driving means each including means for generating a signal proportional to disagreement between the position of said controlled object and the data of said source and for obtaining therefrom the rate of change of said signal, said two signals being proportional in different ratio to the disagreement, and means for shifting control from one of said channels to the other at a critical value of disagreement.

4. In a positional control system, a controlled object, driving means therefor, a control for said driving means, a source of positional data, means for obtaining a signal proportional to the rate of change of disagreement between the position of said object and the data of said source and for applying said signal to said control to damp the motion of the controlled object, and means for obtaining and applying to said control a signal measuring change of a factor tending to cause a phase displacement between said first signal and the response of said object thereto, thereby to maintain said response in proper phase relationship to effect said damping.

5. In a positional control system, a controlled object, driving means therefor, a source of positional data, means for obtaining fine and coarse signals proportional in different ratio to disagreement between the position of said object and the data of said source, means for obtaining a signal proportional to the rate of change of disagreement, selective means for controlling said driving means in accordance with said fine signal during the occurrence of disagreements of limited magnitude and in accordance with a combination of said coarse signal and said rate of change signal during the occurrence of disagreements of greater magnitude, and means further controlling said driving means in accordance with the magnitude of a factor tending to cause a phase displacement between at least one of said signals and the response of said object thereto.

6. In a positional control system, a controlled object, driving means therefor, a controlling object, means furnishing signals corresponding to the positional disagreement of said two objects and controlling said driving means in accordance therewith, and means furnishing a measure of a factor causing a lag in the response of said driving means to said signals for further controlling said driving means in accordance therewith to compensate for said lag.

7. In a positional control system, a controlled object, driving means therefor, a controlling object, means furnishing a measure of the positional disagreement of said two objects and controlling said driving means in accordance therewith, and means responsive to elastic deformation of an element of said driving means for further controlling said driving means to compensate for a phase shift introduced by said deformation between an input to and an output from said driving means.

8. In a positional control system a controlled object, driving means therefor including a hydraulic transmission, a controlling object, means for controlling said driving means in accordance with the positional disagreement between said two objects and means responsive to changes of pressure of the operating fluid in said hydraulic transmission for modifying the control of the control means to compensate for lag in the hydraulic transmission arising from compression and leakage of the operating fluid.

9. In a control system, a controlled object, a hydraulic drive therefor, a displaceable controller, means governing the operating speed of said drive in accordance with the positional disagreement of said object and controller, and means responsive to change of pressure of the operating fluid of said drive for controlling the governing means to alter the speed of said drive to compensate for lag therein, said speed alteration disappearing during extended periods of constant pressure.

10. In a control system, a controlled object, a displaceable controller therefor, means causing said object to follow displacement of said controller including a hydraulic driving element and an element hydraulically driven therefrom, and means responsive to changes of pressure of the operating fluid of said hydraulic elements for altering the speed of said driving element to compensate for lag arising from compression and leakage of the operating fluid.

11. In a positional control system, controlling and controlled objects, means effective on the relative displacements of the objects for furnishing a measure of the positional diagreement thereof, variable speed hydraulic means operated by the controlling object for driving the controlled object into positional agreement with the controlling object, means furnishing an impulse of adjustable duration upon change of pressure of the operating fluid of said hydraulic means, and means jointly controlled by the first and last mentioned means for controlling the speed of said hydraulic means in accordance with a combination of said measured quantity and said impulse.

12. The combination as claimed in claim 11 in which the means furnishing an impulse of adjustable duration comprises a pressure actuated, variable inductance device, means biasing said device to a neutral condition and a time delay device for retarding the operation of said biasing means.

13. In a positional control system, controlling and controlled objects, variable speed driving means for driving the controlled object comprising a variable displacement pump, a hydraulic motor and a pair of conduits connecting said pump and motor to secure a continuous flow of operating fluid therebetween, and means for controlling the displacement of said pump responsive respectively to positional disagreement of said two objects and to change of the differential pressure of the fluid in said two conduits.

14. In a positional control system comprising controlling and controlled objects and servo means causing the controlled object to move in correspondence with the controlling object including a variable speed hydraulic transmission, means for compensating for variable transit time of impulses through said transmission including means supplying a controlling impulse to said hydraulic transmission having components respectively proportional to changes of pressure of the operating fluid and the rate of said changes.

15. In a positional control system, a controlled object, variable speed hydraulic driving means therefor, a controlling object, means controlling the speed of said driving means in accordance with the positional disagreement of said two objects, and means for adjusting said speed responsive to change of pressure of the operating fluid of said driving means, including means for gradually cancelling said adjustment during periods of constant pressure operation.

16. The combination as claimed in claim 15 in which said adjusting means includes a two part inductive pick-off, means actuated by differential pressure changes in the operating fluid of said hydraulic means for relatively displacing the parts of said pick-off, spring centralizing means for returning said pick-off to a neutral condition and adjustable delay means retarding the operation of said centralizing means.

17. The combination as claimed in claim 15 in which said adjusting means includes a pair of resistance elements connected in a bridge circuit, means for differentially varying the resistance of said elements responsive to pressure changes in the operating fluid of said hydraulic means and a condenser-resistance network of predetermined time constant in the output of said bridge circuit for obtaining a transient potential responsive to bridge unbalance.

18. A device for obtaining a transient electrical impulse in response to a change of pressure comprising a pair of members coupled by viscous drag means, means responsive to change of pressure for displacing one of said members, a two part pick-off generating an electrical potential responsive to relative displacement of the parts thereof from a neutral position, means biasing said parts toward said neutral position, means operatively connecting one part of said pick-off with the other of said coupled members and means for adjusting the viscous coupling between said coupled members.

19. In a positional control system, a controlled object, variable speed hydraulic driving means therefor, a source of positional data, means for controlling the speed of said driving means in accordance with data supplied by said source, means for transiently controlling said hydraulic driving means in accordance with changes in the operating speed thereof to damp motion of the controlled object, and pressure-responsive means effective on the initial operation of the hydraulic driving means for further transiently controlling the speed of said hydraulic driving means in accordance with change of pressure of the operating fluid of said hydraulic driving means.

HARVARD L. HULL.
DAVID J. MUNROE.